United States Patent
Aziz et al.

(10) Patent No.: US 10,270,732 B2
(45) Date of Patent: Apr. 23, 2019

(54) PROMOTING SOCIAL MEMORIES ON ONLINE SOCIAL NETWORKS

(71) Applicant: Facebook, Inc., Menlo Park, CA (US)

(72) Inventors: Omid Aziz, San Francisco, CA (US); Bradley Wu, Mountain View, CA (US); Ajay Ramamurthy, Santa Clara, CA (US); Preeti Arunapuram, San Jose, CA (US); Zhenhuan Zhou, Sunnyvale, CA (US); Genevieve Yuriko Williams, San Francisco, CA (US); Xiao Liang, Menlo Park, CA (US); Matthew Ethan Warshauer, San Francisco, CA (US); Tony Hsien-yu Liu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 258 days.

(21) Appl. No.: 15/177,292

(22) Filed: Jun. 8, 2016

(65) Prior Publication Data

US 2017/0359292 A1 Dec. 14, 2017

(51) Int. Cl.
*G06F 15/16* (2006.01)
*H04L 12/58* (2006.01)
*G06Q 50/00* (2012.01)
*H04L 29/08* (2006.01)

(52) U.S. Cl.
CPC ............. *H04L 51/32* (2013.01); *G06Q 50/01* (2013.01); *H04L 51/16* (2013.01); *H04L 67/22* (2013.01); *H04L 67/306* (2013.01)

(58) Field of Classification Search
CPC ............... G06Q 50/01; G06Q 30/0252; G06Q 30/0255; G06Q 30/0256; G06Q 30/0264; G06Q 30/0269; H04W 4/21; H04L 51/32; H04L 51/16; H04L 67/22; H04L 67/306
See application file for complete search history.

(56) References Cited

U.S. PATENT DOCUMENTS

| 8,332,512 | B1* | 12/2012 | Wu ................. G06Q 30/0254 |
| | | | 705/319 |
| 9,325,783 | B2* | 4/2016 | Arfvidsson ............. H04L 67/10 |
| 2015/0058423 | A1* | 2/2015 | Chen ...................... G06Q 50/01 |
| | | | 709/204 |
| 2016/0034459 | A1* | 2/2016 | Larsen ............... G06F 17/30044 |
| | | | 707/740 |
| 2017/0249707 | A1* | 8/2017 | Koch ................. G06F 17/30861 |
| 2017/0317964 | A1* | 11/2017 | Chen ...................... H04L 51/32 |

OTHER PUBLICATIONS

Josh Constine, "Facebook's Timehop Clone "On This Day" Shows You Your Posts From Years Ago", Mar. 24, 2015, pp. 1-4, https://techcrunch.com/2015/03/24/facehop/, pdf attached (Year: 2015).*

* cited by examiner

*Primary Examiner* — Chirag R Patel
*Assistant Examiner* — Rachel J Hackenberg
(74) *Attorney, Agent, or Firm* — Baker Botts L.L.P.

(57) ABSTRACT

In one embodiment, a method includes retrieving a previous communication associated with a user on an online social network, the previous communication having been made on a date in the past; calculating a distribution-probability score for the previous communication reflecting a probability that the previous communication will be shared on the online social network by the user; and sending the previous communication to the user, wherein the distribution-probability score for the previous communication satisfies a threshold.

20 Claims, 6 Drawing Sheets

PROMOTING SOCIAL MEMORIES ON ONLINE SOCIAL NETWORKS

TECHNICAL FIELD

This disclosure generally relates to online social networks, and in particular, communications on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may retrieve a previous communication associated with a first user (e.g., a user of an associated online social network). The previous communication may correspond to past events or stories. The previous communication may have been made at some point in time (e.g., on a date in the past) before a current/future time-point that is of interest. The social-networking system may calculate a distribution-probability score for the previous communication. The distribution-probability score may reflect a probability that the previous communication will be engaged with by the first user (e.g., shared by the first user on the online social network, viewed by the first user for a threshold period of time). The social-networking system may send the previous communication to a client system of the first user. The previous communication may only be sent if its corresponding distribution-probability score satisfies a threshold.

In sending previous communications corresponding to past events or stories, the social-networking system may serve to remind the first user of memories or events from the past and may help connect the first user with the past. Additionally, reminding users of past memories or events may function to trigger feelings of nostalgia or help reconnect users of the online social network. The previous communications may be somehow associated with the current/future time-point at which the previous communication is sent or to be sent to the user, so as to more meaningfully connect the first user with the past. The scoring mechanism may help ensure that the first user is presented with memories that the first user is likely to engage with. One goal of the invention is to encourage the first user to share the previous communications with other users (e.g., on the online social network), who may in turn engage with the previous communications in some manner (e.g., by sharing it themselves, commenting on it). Accordingly, the distribution-probability scores of the previous communications may be based on one or more factors that predict the likelihood that the respective previous communication will be shared. The described method of retrieving and scoring previous communications for users can be resource-intensive, particularly when there are a large number of previous communications across a large user base. Accordingly, some methods to promote efficiency are also described herein. For example, the previous communications may be retrieved in batches of previous communications that correspond to a range of time-points (e.g., a range of dates) to decrease the overall number of retrievals. The efficiency of the scoring process may be further improved by amortizing it over a period of time before the respective communications are to be sent to the first user. The period of time may be varied according to predicted loads. As explained below, although this disclosure focuses on retrieving and sending previous communications that are associated with the first user, the disclosure contemplates retrieving and sending any item (e.g., a news item, a video file) corresponding to past events or stories, whether or not there was an associated communication and whether or not there is an association with the first user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
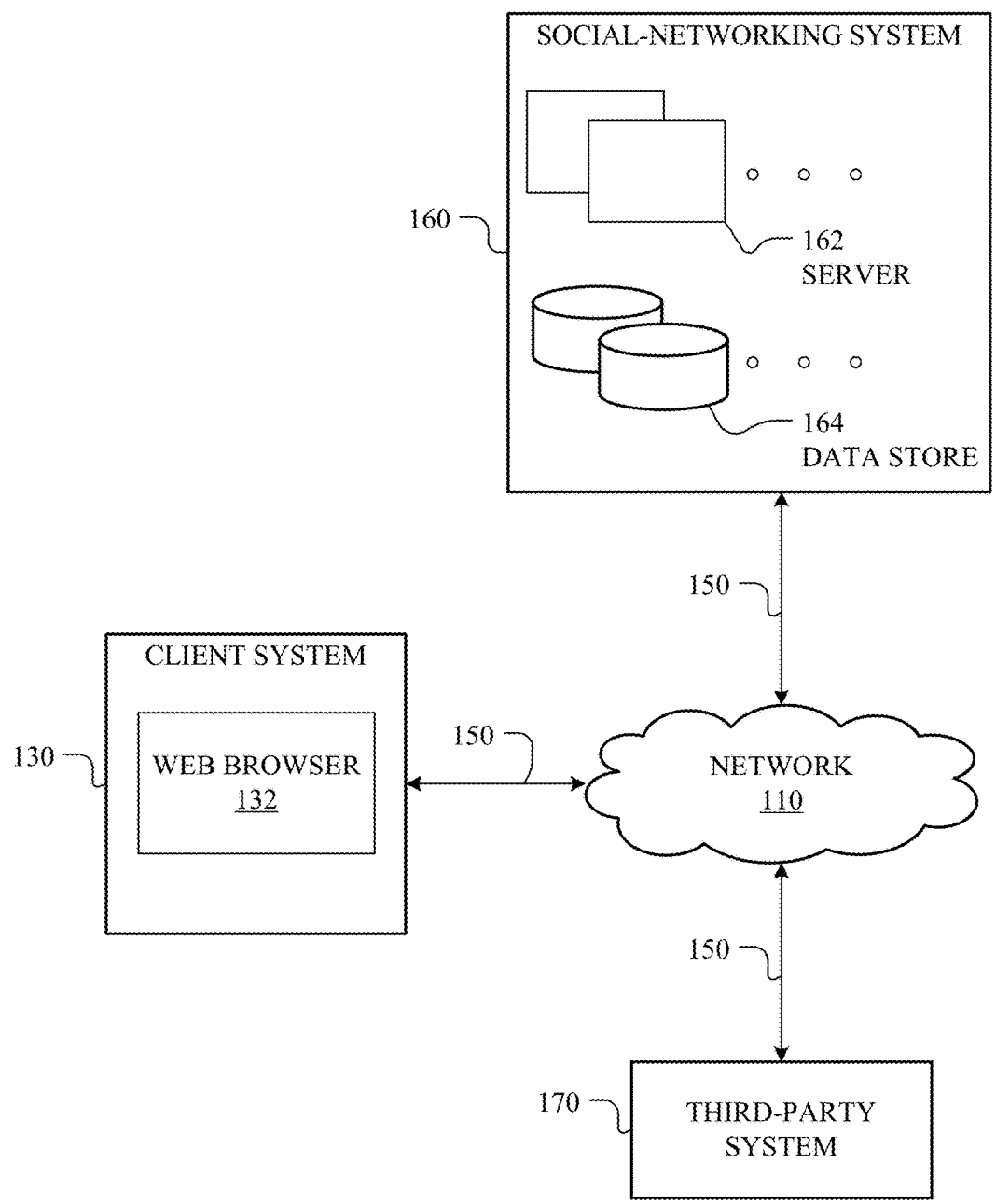
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
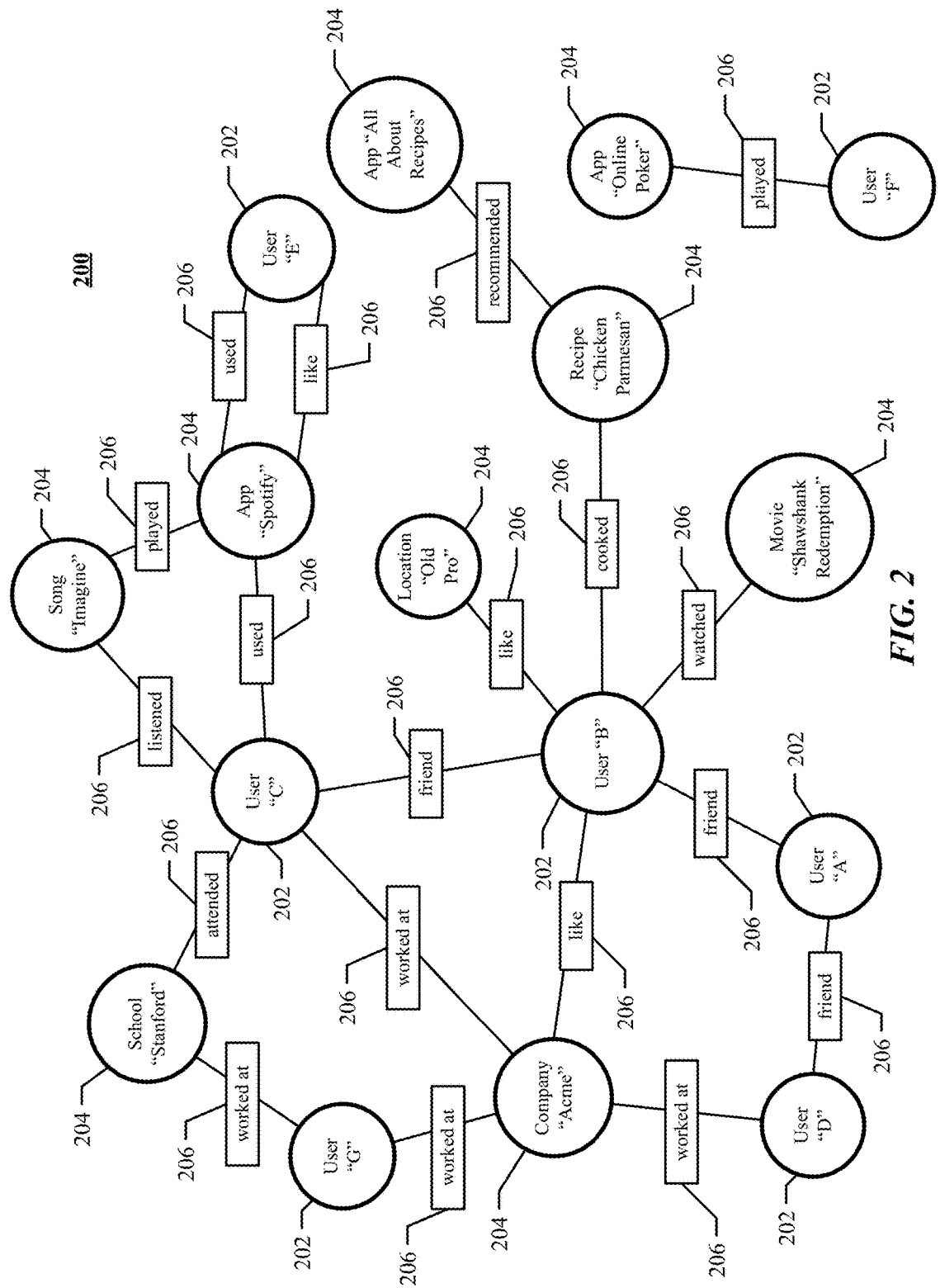
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in an augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160.

Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, the social-networking system 160 may retrieve a previous communication associated with a first user (e.g., a user of an associated online social network). The previous communication may correspond to past events or stories. The previous communication may have been made at some point in time (e.g., on a date in the past) before a current/future time-point that is of interest. The social-networking system 160 may calculate a distribution-probability score for the previous communication. The distribution-probability score may reflect a probability that the previous communication will be engaged with by the first user (e.g., shared by the first user on the online social network, viewed by the first user for a threshold period of time). The social-networking system 160 may send the previous communication to a client system of the first user. The previous communication may only be sent if its corresponding distribution-probability score satisfies a threshold.

In sending previous communications corresponding to past events or stories, the social-networking system 160 may serve to remind the first user of memories or events from the past and may help connect the first user with the past. Additionally, reminding users of past memories or events may function to trigger feelings of nostalgia or help reconnect users of the online social network. The previous communications may be somehow associated with the current/future time-point at which the previous communication is sent or to be sent to the user, so as to more meaningfully connect the first user with the past. The scoring mechanism may help ensure that the first user is presented with memories that the first user is likely to engage with. One goal of the invention is to encourage the first user to share the previous communications with other users (e.g., on the online social network), who may in turn engage with the previous communications in some manner (e.g., by sharing it themselves, commenting on it). Accordingly, the distribution-probability scores of the previous communications may be based on one or more factors that predict the likelihood that the respective previous communication will be shared. The described method of retrieving and scoring previous communications for users can be resource-intensive, particularly when there are a large number of previous communications across a large user base. Accordingly, some methods to promote efficiency are also described herein. For example, the previous communications may be retrieved in batches of previous communications that correspond to a range of time-points (e.g., a range of dates) to decrease the overall number of retrievals. The efficiency of the scoring process may be further improved by amortizing it over a period of time before the respective communications are to be sent to the first user. The period of time may be varied according to predicted loads. As explained below, although this disclosure focuses on retrieving and sending previous communications that are associated with the first user, the disclosure contemplates retrieving and sending any item (e.g., a news item, a video file) corresponding to past events or stories, whether or not there was an associated communication and whether or not there is an association with the first user.

As used herein, the term "communication" may include posts, reshares, comments, and private messages, as these terms are defined below. The term "post" as used herein may include a publication authored by a user on a newsfeed interface or homepage interface of the online social network, on a user's personal-page interface of the online social network (e.g., the user's timeline or wall), on an interface associated with the user's online-social-network connection (e.g., a timeline or wall of the user's first-degree connection or "friend"), on an interface associated with a group on the online social network (e.g., a timeline or wall of a group related to a hobby), or on another suitable interface of the online social network, where the publication does not reference another such publication on the online social network. As used herein, the term "reshare" may include a publication authored by a user on the online social network, where the publication references another publication on the online social network (e.g., the reshare may link to or embed a post). As used herein, the term "comment" may include a publication authored by a user on the online social network that responds to another publication on the online social network (e.g., a post or a reshare). The term may also include a reply to a comment. As used herein, the term "private message" may include any nonpublic messages between or among one or more users on the online social network. As used below, the term "second user," when used with respect to a particular previous communication or item corresponding to a past event or story refers to users, other than the first user, associated with the particular previous communication or item. For the purposes of this disclosure, a communication may include one or more content items (e.g., a video file, an image file, an audio file, an article), or a link thereto.

In particular embodiments, the social-networking system 160 may retrieve one or more previous communications associated with a first user (e.g., of an associated online social network). A previous communication may be associated with the first user by any suitable manner. As examples and not by way of limitation, a previous communication may be associated with the first user if it mentions the first user, includes a "tag" identifying the first user (e.g., a post that tags the first user, a post that includes a photo tagging the first user), was made by the first user, was sent to the first user, was posted on an interface associated with the first user, or contains metadata associated with the first user (e.g., metadata for a video indicating that the video was created on a device of the first user). In cases where there is not yet information associating a previous communication with the first user, the social-networking system 160 may be able to find an association through an analysis of content from the previous communication. As an example and not by way of limitation, the social-networking system 160 may conduct an image analysis of a photo in a particular previous communication to determine that the photo includes an image of the first user, thus associating the particular previous communication with the first user even if the first user was never tagged in the photo. The previous communications may have been made at one or more past time-points before a current/future time-point that is of interest. As an example and not by way of limitation, the previous communications may have been made on one or more dates before a current/future date. Alternatively or additionally, the previous communications may be associated with a past time-point in some other manner. As an example and not by way of limitation, the previous communication may have been made two years ago, but may actually reference a childhood incident from twenty years ago. In this example, the previous communication may have included text (e.g., "me when I was two years old"), content data (e.g., metadata of an attached photo that includes a date when the photo was taken), or other clues (e.g., the hashtag "#throwbackthursday") that help associate the previous communication with a different past time-point. In such cases, the social-networking system 160 may associate the previous communication with the time-point at which the previous communication was made, a time-point associated with the incident that the previous communication actually references, or both.

The past time-points associated with the previous communications may have some significance with respect to the current/future time-point that is of interest. In particular embodiments, the current/future time-point may mark an anniversary of the previous communication or of an event associated with the previous communication. As an example and not by way of limitation, for the current/future time-point May 16, 2016, the social-networking system 160 may retrieve all previous communications that were made on May 16 for all past years, at least two years in the past, the past 108 months, or from any other suitable past time-points. As another example and not by way of limitation, the social-networking system 160 may retrieve previous communications that discuss, or are in some other way associated with, an event for which the current/future time point is an anniversary. For example, a previous communication that was made a week after a May 16, 2010 wedding may be determined to be associated with May 16, 2010 (e.g., based on text that included the May 16, 2010 date, metadata of a photo included in the previous communication). In particular embodiments, the current/future time-point may mark the passage of some meaningful time period following the creation of the previous communication or the occurrence of an event associated with the previous communication. The social-networking system 160 may determine this meaningful time period based on events that it is aware of (e.g., based on information in the previous communication). As an example and not by way of limitation, the social-networking system 160 may be aware of the first user having taken up a challenge to run every day for a period of three weeks (as determined by the text of the previous communication, the joining of a group dedicated to such a challenge, or some other similarly suitable method), and may accordingly retrieve previous communications associated with the challenge at the conclusion of the three weeks. In particular embodiments, the current/future time-point may in some other way be determined to be associated with a previous communication, despite not occurring at any regular or otherwise predictable time period. As an example and not by way of limitation, the social-networking system 160 may determine that an event associated with the current/future time-point may be related to an event associated with the previous communication (or with the past date on which the previous communication was made). In this example, the social-networking system 160 may determine that the first user is graduating high school on the current/future time-point and may accordingly retrieve previous communications associated with the first day of high school (e.g., posts made on that day, posts about that day). Although this disclosure describes retrieving particular previous communications in a particular manner, the disclosure contemplates retrieving any suitable items in any suitable manner.

In retrieving the previous communications, the social-networking system 160 may execute or submit a search query on the backend against one or more indexes that index communications (e.g., post indexes, private message indexes). In particular embodiments, the search query may specify a current/future time-point that is of interest. As an example and not by way of limitation, the current/future time-point may be a current date or a current time. As another example and not by way of limitation, the current/future time-point may be a future date one day from the current date or a future time on the same day (e.g., 3:00 p.m. when it is currently 11:00 a.m.).

In particular embodiments, the search query may specify a range of current/future time-points. As an example and not by way of limitation, the search query may specify a twenty-date range. In this example, the search query may identify previous communications for each of the time-points in the twenty-date range. Specifying a range of current/future time-points in this manner may be useful in conserving processing resources. For example, referencing the above example, only a single query may need to be executed, rather than twenty separate queries. This may reduce the number of overall queries or retrievals having to be executed or performed. The social-networking system 160 may retrieve the previous communications identified by the search query. The social-networking system 160 may cache the retrieved previous communications in a communications cache.

The search query may also specify criteria for identifying past time-points that are of significance to each of the current/future time-point that is of interest. Alternatively or additionally, the search query may specify criteria for identifying previous communications directly without identifying past time-points. These criteria may be based on a concept associated with a current/future time-point. As an example and not by way of limitation, a search query related to a current/future time-point determined to be Mother's Day may return previous communications that mention the first user's mother and include text determined to include the sentiment "Thankful," regardless of the time-point associated with those previous communications. More information on identifying sentiments in communications may be found in U.S. patent application Ser. No. 15/014,846, filed 3 Feb. 2016, which is incorporated by reference.

In particular embodiments, the social-networking system 160 may calculate a distribution-probability score for one or more previous communications. In particular embodiments, a unique distribution-probability score may be calculated for a previous communication based on the respective current/future time-points for which it was retrieved. As an example and not by way of limitation, if previous communications c1 and c2 were retrieved for a current/future date d1 and if previous communications c3 and c4 were retrieved for a current/future date d2, c1 and c2 may be scored together with respect to d1 and c3 and c4 may be scored together with respect to d2. In particular embodiments, a single previous communication may be relevant to more than one current/future time-point and may consequently have a different distribution-probability score calculated for each applicable time-point. As an example and not by way of limitation, building on the previous example, the previous communication c1 may have a first distribution-probability score calculated for the current/future date d1 and a second distribution-probability score calculated for the current/future date d2. In calculating the distribution-probability score, if the social-networking system 160 makes use of a communications cache, as described below, the previous communications may be retrieved for scoring from the communications cache.

In particular embodiments, the distribution-probability score of a previous communication may reflect a probability that the first user will engage with the previous communication. User engagement with a previous communication may include any act that indicates user interest in the previous communication. Such an act may include viewing the previous communication for a threshold period of time (e.g., five seconds), positioning a pointer device over the previous communication, share the previous communication with other persons (e.g., with other users on the online social network), submitting a further communication about the previous communication (e.g., a new post describing as aspect of the previous communication), submitting a comment, or submitting a reaction-input (e.g., a like) to the previous communication.

The distribution-probability score may be calculated based on any combination of one or more factors determined by the social-networking system 160. The factors may be associated with the respective previous communication, the first user, second users associated with previous communications, or external events not associated with either the first user or second users. These factors may be determined based on the content of a previous communication (e.g., the text of a post, a video included in the post), the metadata of a previous communication, user interactions associated with the previous communication, the second users tagged in the previous communication, information associated with the first user, information associated with external events (e.g., events described in the news), or sentiments associated with a communication.

In particular embodiments, the distribution-probability score may be based on a meaning associated with a previous communication and a significance that meaning has with the current/future time-point of interest. To determine the meaning of a previous communication, the social-networking system 160 may perform any suitable combination of analyses to understand what the previous communication is about. As an example and not by way of limitation, if the communication includes images (e.g., a photo, a video), the social-networking system 160 may use an image-recognition feature to recognize persons or concepts in the previous communication and determine what the previous communication is about. In this example, the social-networking system 160 may analyze a photo of a birthday cake and determine that a post in which the photo was included is about a birthday and score the post appropriately (e.g., if the current/future time-point of interest is the first user's birthday, the birthday post may receive a higher distribution-probability score than a post about a presidential election). More information about analyzing images to recognize persons or concepts may be found in U.S. patent application Ser. No. 13/959,446, filed 5 Aug. 2013, and U.S. patent application Ser. No. 14/983,385, filed 29 Dec. 2015, both of which are incorporated by reference. As another example and not by way of limitation, the social-networking system 160 may perform an analysis of audio included in the previous communication (e.g., using speech-recognition software). As another example and not by way of limitation, the social-networking system 160 may analyze text associated with the previous communication (e.g., text of the previous communication, hashtags, text of an article linked by the previous communication) to determine what the previous communication is about. The social-networking system 160 may associate the previous communication with one or more relevant topics and score it based on those topics. For example, the social-networking system 160 may determine that a post with the text "best birthday ever" may be about a birthday and score it appropriately (e.g., if the current/future time-point of interest is the first user's birthday, the birthday post may receive a higher distribution-probability score than a post about a wedding). More information about analyzing text to determine what a communication is about and how particular topics may be associated to communications based on the text within the communications may be found in U.S. patent application Ser. No. 15/014,846, filed 3 Feb. 2016, and U.S. patent application Ser. No. 14/858,366, filed 18 Sep. 2015, which are incorporated by reference. Additionally, the social-networking system 160 may use one or more features of the deep-learning model described in co-pending U.S. patent application Ser. No. 14/949,436, filed 23 Nov. 2015, which is incorporated by reference. As another example and not by way of limitation, the social-networking system 160 may analyze the metadata associated with a previous communication to determine an associated meaning. For example, the social-networking system 160 may determine that a previous communication was made within a threshold period of time from a natural disaster and/or within a threshold geographical distance from the natural disaster, and may consequently determine that the previous communication is associated with the natural disaster. In this example, the social-networking system 160 may calculate a relatively high distribution-probability score for the previous communication on an anniversary of the natural disaster or of the previous communication (e.g., because it may be a significant event for the user).

In particular embodiments, the distribution-probability score may be based on a meaning associated with a previous communication and historical data of user engagement with communications having that meaning. The historical data may include data associated with the first user, one or more second users, social connections of the first user (e.g., first-degree connections, second-degree connections), or all users generally (e.g., users of the online social network, users of a third-party system). As an example and not by way of limitation, previous communications containing images of babies or pets may have a historically high engagement rate, and previous communications including such images may consequently receive a relatively high distribution-probability score. As another example and not by way of limitation, previous communications about politics may not have a historically high engagement rate, and previous communications about politics may consequently receive a relatively low distribution-probability score. In particular embodiments, the distribution-probability score may be based on current/future external events. As an example and not by way of limitation, a previous communication relating to elections may receive a higher distribution-probability score if the current/future time-point is near an election period than otherwise. Although this disclosure describes calculating a particular score in a particular manner, the disclosure contemplates calculating any suitable score in any suitable manner.

In particular embodiments, the distribution-probability score may be based on an affinity coefficient of the first user with respect to one or more second users associated with the previous communication. As an example and not by way of limitation, a second user may be another user of the online social network. In this example, a previous communication that tags a close friend of the first user (e.g., a user who often communicates with the first user on the online social network) may receive a higher distribution-probability score than a similar previous communication that tagged a friend who was not as close of a friend of the first user. In particular embodiments, the distribution-probability score may be based on an affinity coefficient of the first user with respect to one or more concepts associated with the previous communication. As an example and not by way of limitation, a previous communication that discusses a hobby of the user (as determined by, for example, the first user's profile information or the user's memberships in groups) may receive a higher distribution-probability score than an otherwise similar previous communication that discusses something mundane. In particular embodiments, the distribution-probability score may be based on a history of user interactions between the first user and one or more second users associated with the previous communication. As an example and not by way of limitation, a previous communication that tags a childhood friend of the user with whom the first user has not been in contact for a long time may receive a relatively high distribution-probability score (e.g., because such a post may trigger nostalgia, may be interesting to the first user and the childhood friend, or may lead to further interactions between the two).

In particular embodiments, the distribution-probability score may be based on an engagement level of one or more second users associated with the previous communication. As an example and not by way of limitation, a previous communication that mentions a particular second user who is particularly active on the online social network (e.g., one who shares posts or content frequently, logs on frequently) may receive a higher distribution-probability score than a similar previous communication that mentions only a less active second user. In particular embodiments, the distribution-probability score may be based on a number of second users that are associated with the previous communication. As an example and not by way of limitation, a previous communication that tagged three users may receive a higher score than a similar previous communication that only tagged one user. In particular embodiments, the distribution-probability score may be based on one or more social interactions associated with the previous communication. As and example and not by way of limitation, social interactions may include user reactions (e.g., likes), comments, shares, the amount of time a user views a communication, or other suitable interactions by the first user, second users, or any other user. In this example, a previous communication with a high number of reactions or comments may receive a higher distribution-probability score than a similar previous communication with a lower number of reactions or comments. The social-networking system 160 may employ any suitable algorithm to ensure that previous communications that are more likely to be engaged with received higher distribution-probability scores. As an example and not by way of limitation, the social-networking system 160 may calculate a relatively low distribution-probability score for communications that have a low ratio of likes to comments (e.g., because this may indicate that this is not a positive memory for the first user, such that the first user may not want to engage with it).

In particular embodiments, the distribution-probability score may be based on information associated with the first user. As an example and not by way of limitation, the distribution-probability score may be based on the first user's interests, which may be determined by, for example, analyzing the user's prior communications, social interactions, memberships in groups, profile information, social-graph information, or other sources. For example, for a first user who is a member of a boxing group on the online social network, a previous communication about a boxing fight may receive a relatively high distribution-probability score. As another example and not by way of limitation, the distribution-probability score may be based on demographic information of the first user. For example, a user of a particular gender may share certain types of previous communications more than others. In particular embodiments, the distribution-probability score may be based on the types of communications that the first user typically engages with. As an example and not by way of limitation, for a user who frequently posts about computers, a previous communication about computers may receive a relatively high distribution-probability score.

In particular embodiments, the distribution-probability score may be based on one or more sentiments associated with a previous communication. These sentiments may be determined by performing a sentiment analysis (e.g., based on information gathered from the above-discussed analyses to determine a sentiment associated with a post). The distribution-probability score may account for the fact that previous communications associated with certain sentiments may be more likely to be engaging than previous communications associated with other sentiments. For example, the social-networking system 160 may determine that a previous communication including a photo with a birthday cake is associated with the sentiment "Happy" or "Excited," and score it appropriately. In this example, such previous communication may receive a higher distribution-probability score than a previous communication with the sentiment "Bored." More information on identifying sentiments in communications may be found in U.S. patent application Ser. No. 15/014,846, filed 3 Feb. 2016, which is incorporated by reference.

In particular embodiments, the social-networking system 160 may, combine any of the factors described above in any suitable manner to arrive at a more complex factor that may further affect the calculation of the distribution-probability scores. As an example and not by way of limitation, the social-networking system 160 may determine that a particular previous communication is related to a wedding (e.g., by analyzing an included photo) and the social-networking system 160 may further determine that the first user was once married and is currently single (e.g., by analyzing the first user's current and past profile information). In this example, the social-networking system 160 may calculate a relatively low distribution-probability score for the previous communication (e.g., because the first user may likely not want to be reminded about the user's former marriage). As another example and not by way of limitation, the social-networking system 160 may determine that a communication is about an ex-boyfriend or ex-girlfriend (e.g., based on analyzing the content of the previous communication and analyzing first user's current and past profile information). In this example, the social-networking system 160 may calculate a relatively low distribution-probability score for the previous communication. In particular embodiments, the social-networking system 160 may weight any of the factors in any suitable manner in order to calculate the distribution-probability score. As an example and not by way of limitation, the engagement level of the second users associated with a previous communication may be weighted more than the number of likes associated with the previous communication.

In particular embodiments, the calculation of the distribution-probability score may be weighted such that certain types of predicted engagement are preferred over others. As an example and not by way of limitation, a previous communication that the first user is likely to share may receive a higher distribution-probability score than a similar previous communication that the first user is simply likely to view for a period of time.

In particular embodiments, the social-networking system 160 may employ a scoring schedule that amortizes the calculation of distribution-probability scores for a set of users (e.g., all users of the online social network) across a predetermined period of time. This amortization may improve overall efficiency by ensuring that processing resources are being used in a steady manner. As an example and not by way of limitation, the social-networking system 160 may begin calculating distribution-probability scores for previous communications relevant to a particular current/future time-point twenty-four hours before one or more previous communications relevant to the particular past time-point are to be sent to users of the online social network (e.g., twenty-four hours before the current/future time point of interest). In this example, the social-networking system 160 may amortize the calculations over this twenty-four-hour period by scoring previous communications of different users in batches. For example, the social-networking system 160 may process batches of N users per hour, where N=Total Number of Social-Network Users/24 hours, where the denominator represents the number of hours in a twenty-four-hour period. The users in each batch may be selected at random, based on time zones, based on countries, any other suitable characteristic, or any combination thereof. The number of users in a batch may also be varied based on the characteristics of users within the batch. As an example and not by way of limitation, a batch that includes a high number of users who post frequently (thus requiring more communications overall to be analyzed and scored) may not include as many users as a batch that does not include as many frequent posters. Alternatively, the social-networking system 160 may simply batch the users such that the different batches have a threshold similarity in the types of users (e.g., each having a certain proportion of frequent posters).

In particular embodiments, the social-networking system 160 may vary the period of time over which the calculations are made based on a respective predicted load. As an example and not by way of limitation, the period of time allotted to calculations may be increased for a date coinciding with a holiday or a periodic event for which the number of previous communications made are expected to be high. In this example, if the social-networking system 160 typically allots a twenty-four-hour period for scoring previous communications for an average day, it may allot a forty-eight-hour period for scoring previous communications for Christmas Day, which may historically have a high number of communications across the world. In particular embodiments, the social-networking system 160 may vary the period of time based on the actual number of communications that are to be scored. As an example and not by way of limitation, if there is a day for which there happens to be a large number of communications, despite the day not being otherwise special, the social-networking system 160 may increase the period of time for calculating scores for that day.

In particular embodiments, the social-networking system 160 may calculate a distribution-probability score for each of the retrieved previous communications. Alternatively, it may selectively calculate distribution-probability scores for only certain retrieved previous communications, at least under certain circumstances. As an example and not by way of limitation, for a current/future time-point that corresponds to a birthday, the social-networking system 160 may only calculate distribution-probability scores for previous communications that are related to birthdays. In this example, the other previous communications may be filtered out. This may function as a shortcut mechanism that may conserve processing resources.

In particular embodiments, the social-networking system 160 may send the one or more previous communications to a client system of the first user. The previous communications may only be sent if their corresponding distribution-probability scores satisfy a threshold. As an example and not by way of limitation, the social-networking system 160 may have a predetermined threshold distribution-probability score, and the previous communication may only be sent to the first user if its corresponding distribution-probability score is at least equal to the threshold distribution-probability score. The threshold distribution-probability score may correspond to a desired probability of user engagement. As an example and not by way of limitation, the threshold distribution-probability score may correspond to a desired 5.6% probability that a previous communication will be shared by the first user. Although this disclosure describes sending particular previous communications to a particular system in a particular manner, the disclosure contemplates sending any suitable items to any suitable system in any suitable manner.

In particular embodiments, the threshold distribution-probability score may vary based on the type of content included in a previous communication that is being scored. As an example and not by way of limitation, the threshold distribution-probability score required for a previous communication with a link to an article may be higher than the threshold distribution-probability score required for a previous communication including a photo. This may account for the fact that certain types of content are by their very nature are more likely to be engaging in the context of sharing previous communications.

In particular embodiments, previous communications may be ranked based on their distribution-probability scores and the threshold may be a threshold rank, such that only previous communications above the threshold rank may be sent to the user. As an example and not by way of limitation, the previous communications with the top three distribution-probability scores may be sent to the user. In particular embodiments, these previous communications may also be subject to a threshold distribution-probability score, such that they may not be sent until they meet the threshold distribution-probability score. Alternatively, these previous communications may be sent regardless of whether their respective distribution-probability score surpasses a threshold distribution-probability score.

If the social-networking system 160 makes use of a communications cache as described above, the communications cache may be cleared regularly. As an example and not by way of limitation, certain previous communications may be purged from the communications cache once their respective current/future time-point has already occurred or after the previous communications for the respective current/future time-point that satisfied the threshold have been sent to the first user.

Figure 3:
FIG. 3 illustrates an example of a memories interface including previous communications from several relevant past time-points.

The one or more previous communications may be rendered and displayed to the first user on any suitable interface. As an example and not by way of limitation, the one or more previous communications may be displayed on a newsfeed being viewed by the user. As another example and not by way of limitation, the one or more previous communications may be displayed on a "memories interface," which may be an interface including one or more previous communications from several previous time-points. FIG. 3 illustrates an example of a memories interface including previous communications from several relevant past time-points. As an example and not by way of limitation, referencing FIG. 3, the memories interface may display the previous communication 320 (which may have been authored six years ago) and the previous communication 340 (which may have been authored eight years ago).

Although this disclosure focuses on retrieving, scoring, and displaying previous communications, the disclosure contemplates retrieving, scoring, and displaying any item (e.g., a news item, an article, a blurb natively generated on the online social network) corresponding to past events or stories, whether or not there was an associated communication. As an example and not by way of limitation, referencing FIG. 3, the social-networking system 160 may retrieve, score, and display the news item 310 (e.g., describing the creation of a social connection between the first user and the second user named "Shawn"). Furthermore, although this disclosure focuses on retrieving, scoring, and displaying previous communications that are associated with the first user, the disclosure contemplates displaying any past communication, event, or story, regardless of an association with the first user. As an example and not by way of limitation, the social-networking system 160 may display a news item corresponding to an important event or story (e.g., the anniversary of the end of World War II). In particular embodiments, as is the case in FIG. 3, the different previous communications (or news items) may be organized and displayed in chronological order (e.g., oldest to newest, newest to oldest). In particular embodiments, the different previous communications (or news items) may be organized and displayed in an order based on their relative distribution-probability scores, regardless of chronological order.

Figure 4:
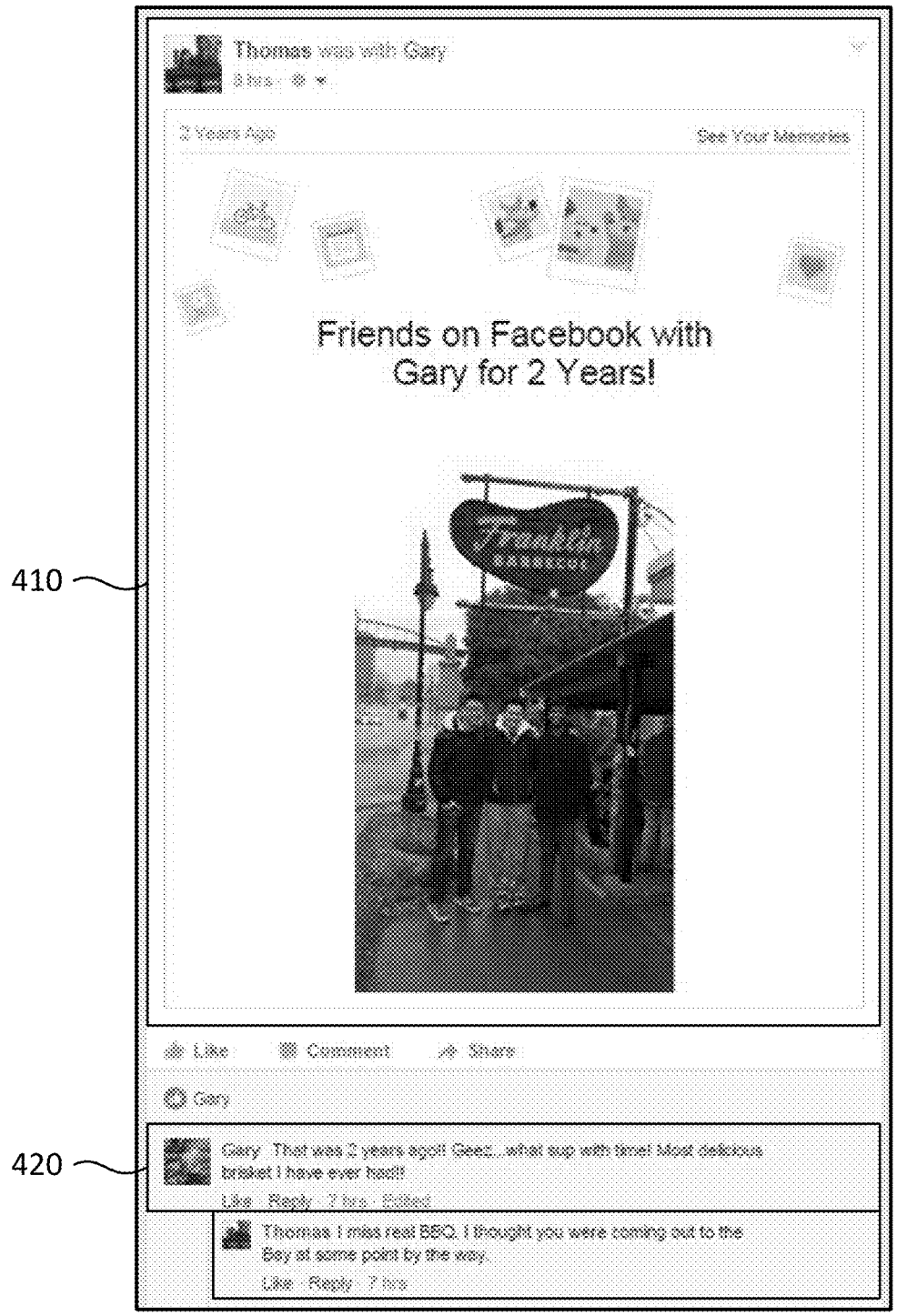
FIG. 4 illustrates an example of a previous communication that was shared on the online social network.

In particular embodiments, one or more of the previous communications may be shared by the first user (e.g., on the online social network, on a third-party platform, via email). As an example and not by way of limitation, the previous communications may be shared on the online social network as a post/reshare or as a private message. FIG. 4 illustrates an example of a previous communication that was shared on the online social network. Referencing FIG. 4, the first user (e.g., "Thomas") may have shared the previous communication 410 as a post on the online social network. In particular embodiments, the first user may be able to specify privacy settings for a previous communication that is to be shared. The first user may specify that only selected users or groups of users may be able to view the newly shared previous communication. As an example and not by way of limitation, referencing FIG. 4, the first user (e.g., "Thomas") may specify that the previous communication 410 is only to be shared with the tagged second user (e.g., "Gary"), such that other users may not be able to view the newly shared previous communication. As another example and not by way of limitation, the first user may specify that the previous communication 410 may be viewed by all users of the online social network, or members of the public, generally.

In particular embodiments, the social-networking system 160 may calculate a share-value score, which may reflect a probability that one or more other users (e.g., second users, other users of the online social network, other users of a third-party system) will engage with the previous communication. User engagement with a previous communication is described in further detail above with respect to the first user, and the same description applies with respect to second users. As an example and not by way of limitation, referencing FIG. 4, the posting of the comment 420 by the second user Gary may be a user engagement. The share-value score may reflect the probability that similar user engagements will occur. In particular embodiments, the distribution-probability score may be based on the share-value score. As an example and not by way of limitation, the social-networking system 160 may calculate a higher distribution-probability score for a previous communication with a relatively high share-value score than for one with a relatively low share-value score. This may be because the first user may be more likely to share a previous communication if second users are likely to engage with the previous communication. It may be advantageous to promote (e.g., by increasing the distribution-probability score) previous communications that are likely to engage second users because the first user may receive social benefits from sharing such previous communications and may consequently share more previous communications over time. As an example and not by way of limitation, the first user may be more likely to share a previous communication if other previous communications the first user shared in the past received comments or likes from second users.

In particular embodiments, the share-value score of a previous communication may be based on prior social interactions or sharing activity of one or more second users associated with the previous communication with respect to prior shared previous communications. As an example and not by way of limitation, if a particular second user has frequently liked previous communications shared by the first user, a previous communication that mentions the particular second user may receive a higher share-value than otherwise. In particular embodiments, the same or similar types of information about the first user that may be used to calculate the distribution-probability scores may be used to calculate share-value scores. As an example and not by way of limitation, the share-value score of a previous communication may be based on engagement levels of one or more second users associated with the previous communication. For example, a particular second user who posts or logs on frequently on the online social network may be more likely to engage with a previous communication shared by the first user. Accordingly, the previous communication may receive a higher share-value score for being associated with the particular second user than it would have otherwise. As another example, the share-value score of a previous communication may be based on the types of communications that the second user typically engages with. For example, if a particular second user typically comments on communications including photos of babies and not photos of dogs, a previous communication including a photo of a baby and tagging the second user may receive a higher share-value score than a previous communication including a photo of a dog and tagging the same second user.

In particular embodiments, the social-networking system 160 may send, to the client system of the first user, a share-value indication for a particular previous communication that is based on the share-value score. The share-value indication may be a numerical value that indicates the share-value score, a binary value (e.g., "engaging"/"not engaging"), or any other suitable value. The share-value indication may be displayed to the first user in any suitable manner. As an example and not by way of limitation, referencing FIG. 3, the share-value indication 330 may be displayed to the user in connection with the previous communication 320. In this example, the social-networking system 160 may have calculated a share-value score that indicates a 30 percent probability that a second user will engage with the previous communication 320. The share-value indication may be useful to the first user in deciding whether or not to share a previous communication.

Figure 5:
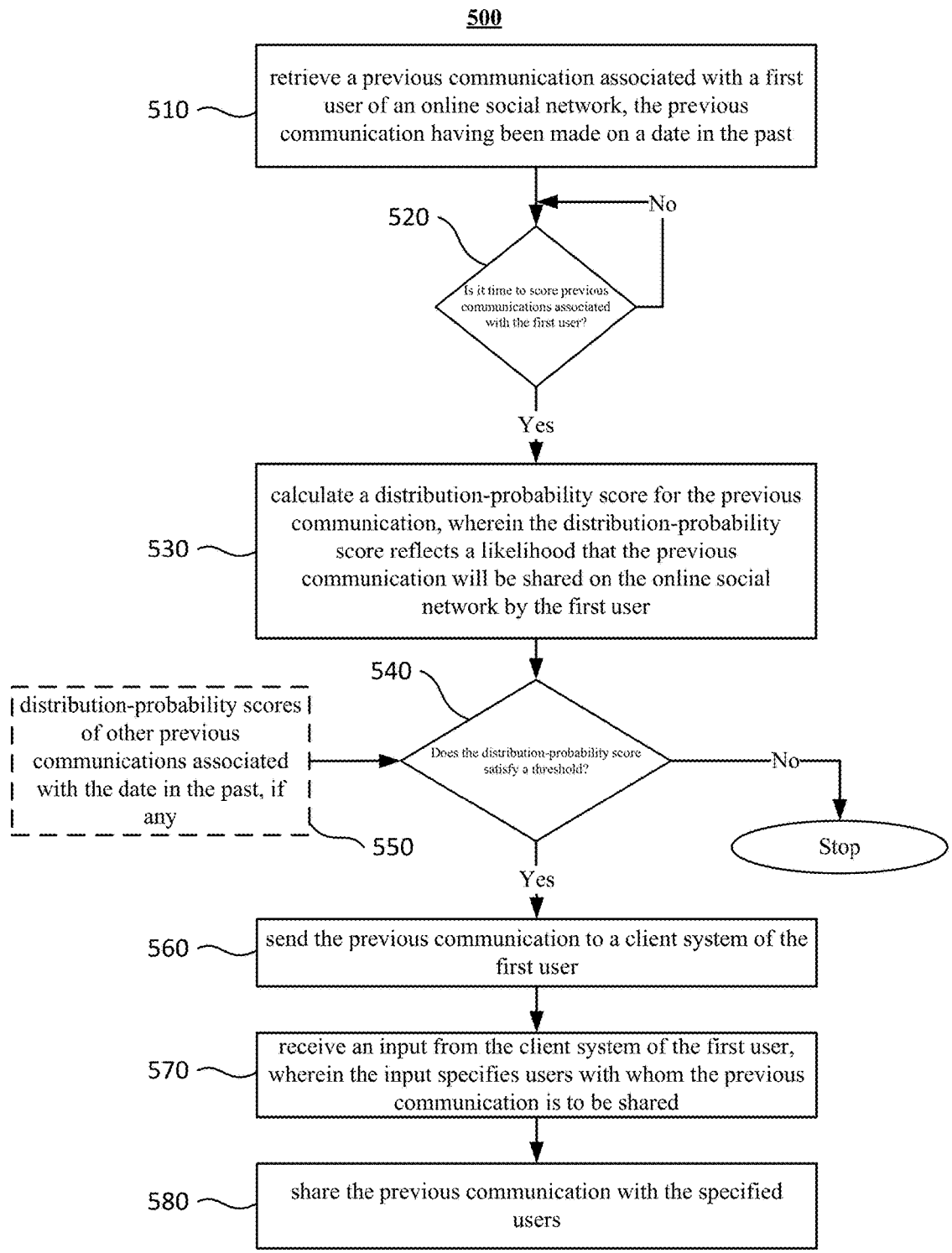
FIG. 5 illustrates an example method for sending and sharing a previous communication that satisfies a threshold distribution-probability score.

FIG. 5 illustrates an example method 500 for sending and sharing a previous communication that satisfies a threshold distribution-probability score. The method may begin at step 510, where the social-networking system 160 may retrieve a previous communication associated with a first user of an online social network, the previous communication having been made on a date in the past. At step 520, the social-networking system 160 may determine whether it is time to calculate a distribution-probability score for communications associated with the first user (e.g., as determined by a scoring schedule, as described above). If it is not yet time, the social-networking system 160 may wait. If it is time, the social-networking system 160 may proceed to step 530, at which point it may calculate a distribution-probability score for the previous communication, wherein the distribution-probability score reflects a likelihood that the previous communication will be shared on the online social network by the first user. At step 540, the social-networking system 160 may determine whether the calculated distribution-probability score satisfies a threshold. This determination may depend on the distribution-probability scores of other previous communications associated with the date in the past, if any such previous communications exist, as illustrated by element 550. If the threshold is not satisfied, the method is stopped. If the threshold is satisfied, the social-networking system 160 may proceed to step 560, at which point it may send the previous communication to a client system of the first user. At step 570, the social-networking system 160 may receive an input from the client system of the first user, wherein the input specifies users with whom the previous communication is to be shared. At step 580, the social-networking system 160 may share the previous communication with the specified users. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sending and sharing a previous communication that satisfies a threshold distribution-probability score including the particular steps of the method of FIG. 5, this disclosure contemplates any suitable method for sending and sharing a previous communication that satisfies a threshold distribution-probability score including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
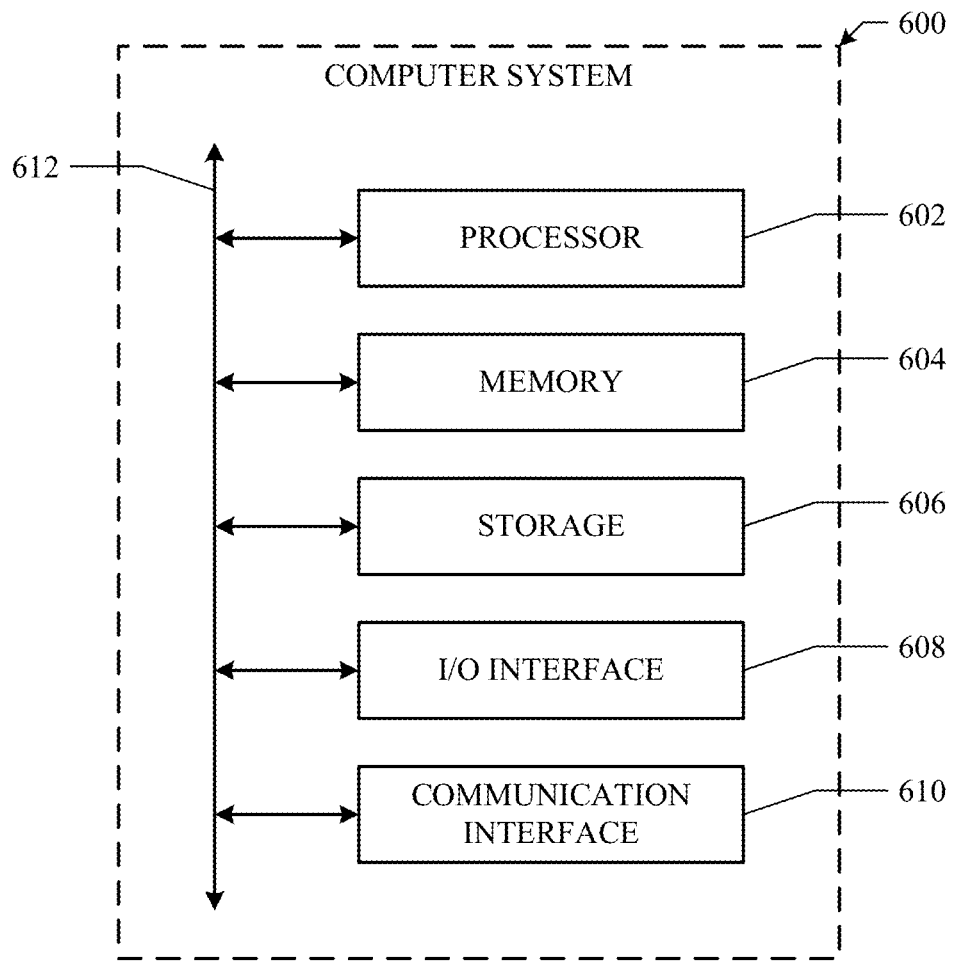
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computer server machine, retrieving a previous communication associated with a first user and a second user of an online social network, the previous communication having been made on a date in the past;
    by the computer server machine, calculating a distribution-probability score for the previous communication based on a duration of time during which the first user has not had contact with the second user associated with the previous communication, wherein the distribution-probability score reflects a probability that the previous communication will be shared on the online social network by the first user;
    by the computer server machine, determining that the distribution-probability score for the previous communication satisfies a threshold; and by the computer server machine, in response to determining that the distribution-probability score for the previous communication satisfies the threshold, sending the previous communication to a client system of the first user.

2. The method of claim 1, wherein calculating the distribution-probability score further comprises:
   accessing a social graph comprising a plurality of nodes and a plurality of edges connecting the nodes, each of the edges between two of the nodes representing a single degree of separation between the two nodes, the nodes comprising:
      a first node corresponding to the first user; and
      a plurality of second nodes that each correspond to a second user or a concept,
   wherein the second nodes are associated with one or more of the retrieved previous communications; and
   determining the distribution-probability score based on social-graph information corresponding to the first node and one or more of the second nodes.

3. The method of claim 2, wherein the social-graph information comprises an affinity coefficient of the first user with respect to a particular second user or a particular concept corresponding to a particular second node associated with the previous communication, an engagement level of the particular second user corresponding to the particular second node associated with the previous communication, or a number of second users corresponding to second nodes that are associated with the previous communication.

4. The method of claim 1, wherein the distribution-probability score of the previous communication is based on an image-recognition analysis of an image associated with the previous communication or an analysis of text associated with the previous communication.

5. The method of claim 1, wherein the distribution-probability score of the previous communication is based on one or more sentiments associated with the previous communication, or one or more social interactions associated with the previous communication.

6. The method of claim 1, further comprising caching the retrieved previous communications in a data store associated with the computer server machine.

7. The method of claim 1, further comprising:
   retrieving a set of previous communications associated with the first user, the set of previous communications having been made on a date in the past;
   calculating a distribution-probability score for each of the previous communications in the set;
   determining a ranking of each of the previous communications based on their respective distribution-probability scores; and
   wherein, based on the ranking, one or more of the previous communications in the set is selected as having a distribution-probability score satisfying the threshold, and wherein each of the selected previous communications is sent to the client system of the first user.

8. The method of claim 1, wherein a date on which the previous communication is sent to the client system of the first user is associated with an event that is related to a past event associated with the previous communication.

9. The method of claim 1, further comprising sending, to the client system of the first user, a share-value indication relating to a probability that one or more second users will engage with the previous communication.

10. The method of claim 9, wherein the probability that one or more second users will engage with the previous communication comprises a probability that the one or more second users will reshare the previous communication, submit a further communication about the previous communication, a comment, or a reaction-input to the previous communication.

11. The method of claim 1, wherein calculating the distribution-probability score comprises accessing a scoring schedule, wherein the scoring schedule specifies a time period for calculating the distribution-probability score for the first user.

12. The method of claim 11, wherein the scoring schedule is based on a number of communications associated with a particular date.

13. One or more computer-readable non-transitory storage media embodying software that is operable when executed to:
   retrieve a previous communication associated with a first user and a second user of an online social network, the previous communication having been made on a date in the past;
   calculate a distribution-probability score for the previous communication based on a duration of time during which the first user has not had contact with the second user associated with the previous communication, wherein the distribution-probability score reflects a probability that the previous communication will be shared on the online social network by the first user;
   determine that the distribution-probability score for the previous communication satisfies a threshold; and
   send, in response to determining that the distribution-probability score for the previous communication satisfies the threshold, the previous communication to a client system of the first user.

14. The media of claim 13, wherein when calculating the distribution-probability score, the software is further operable when executed to:
   access a social graph comprising a plurality of nodes and a plurality of edges connecting the nodes, each of the edges between two of the nodes representing a single degree of separation between them, the nodes comprising:
      a first node corresponding to the first user; and
      a plurality of second nodes that each correspond to a second user or a concept,
   wherein the second nodes are associated with one or more of the retrieved previous communications; and
   determine the distribution-probability score based on social-graph information corresponding to the first node and one or more of the second nodes.

15. The media of claim 14, wherein the social-graph information comprises an affinity coefficient of the first user with respect to a particular second user or a particular concept corresponding to a particular second node associated with the previous communication, an engagement level of the particular second user corresponding to the particular second node associated with the previous communication, or a number of second users corresponding to second nodes that are associated with the previous communication.

16. The media of claim 13, wherein the distribution-probability score of the previous communication is based on an image-recognition analysis of an image associated with the previous communication or an analysis of text associated with the previous communication.

17. The media of claim 13, wherein the software is further operable when executed to:

retrieve a set of previous communications associated with the first user, the set of previous communications having been made on a date in the past;

calculate a distribution-probability score for each of the previous communications in the set;

determine a ranking of each of the previous communications based on their respective distribution-probability scores; and wherein, based on the ranking, one or more of the previous communications in the set is selected as having a distribution-probability score satisfying the threshold, and wherein each of the selected previous communications is sent to the client system of the first user.

18. The media of claim 13, wherein the distribution-probability score of the previous communication is based on one or more sentiments associated with the previous communication, or one or more social interactions associated with the previous communication.

19. The media of claim 13, wherein the software is further operable when executed to:

send, to the client system of the first user, a share-value indication relating to a probability that one or more second users will engage with the previous communication.

20. A system comprising: one or more processors; and a memory coupled to the processors comprising instructions executable by the processors, the processors being operable when executing the instructions to:

retrieve a previous communication associated with a first user and a second user of an online social network, the previous communication having been made on a date in the past;

calculate a distribution-probability score for the previous communication, based on a duration of time during which the first user has not had contact with the second user associated with the previous communication, wherein the distribution-probability score reflects a probability that the previous communication will be shared on the online social network by the first user;

determine that the distribution-probability score for the previous communication satisfies a threshold; and send, in response to determining that the distribution-probability score for the previous communication satisfies the threshold, the previous communication to a client system of the first user.

* * * * *